United States Patent

[11] 3,601,210

[72] Inventors Robert N. Stedman
 Chillicothe;
 Donald E. Sunderlin, Washington;
 Frederick R. Leggett, Peoria; Willis R.
 Daft, Peoria, all of, Ill.
[21] Appl. No. 832,655
[22] Filed June 12, 1969
[45] Patented Aug. 24, 1971
[73] Assignee Catepillar Tractor Co.
 Peoria, Ill.

[54] METHOD AND APPARATUS FOR STEERING FOUR-TRACK TRACTORS
 7 Claims, 2 Drawing Figs.
[52] U.S. Cl. ................................................ 180/6.7,
 180/14 R
[51] Int. Cl. ..................................................... B62d 11/06
[50] Field of Search ......................................... 180/6.7,
 6.2, 14

[56] References Cited
UNITED STATES PATENTS
2,220,418 11/1940 McIntyre ..................... 180/6.7 X
3,324,963 6/1967 Stroot et al. .................. 180/6.2
3,477,534 11/1969 Ladwig ........................ 180/14

Primary Examiner—Benjamin Hersh
Assistant Examiner—John A. Pekar
Attorney—Fryer, Tjensvold, Feix, Phillips & Lempio ABSTRACT: A steering system for a tractor or combined tractors having four tracks in side-by-side relationship in which power to one track only, wither extreme right or extreme left is interrupted while full power to all other tracks continues to drive. Brake means for braking all tracks simultaneously is included, and means effective when power to one track is interrupted, to direct the braking force exclusively to that track.

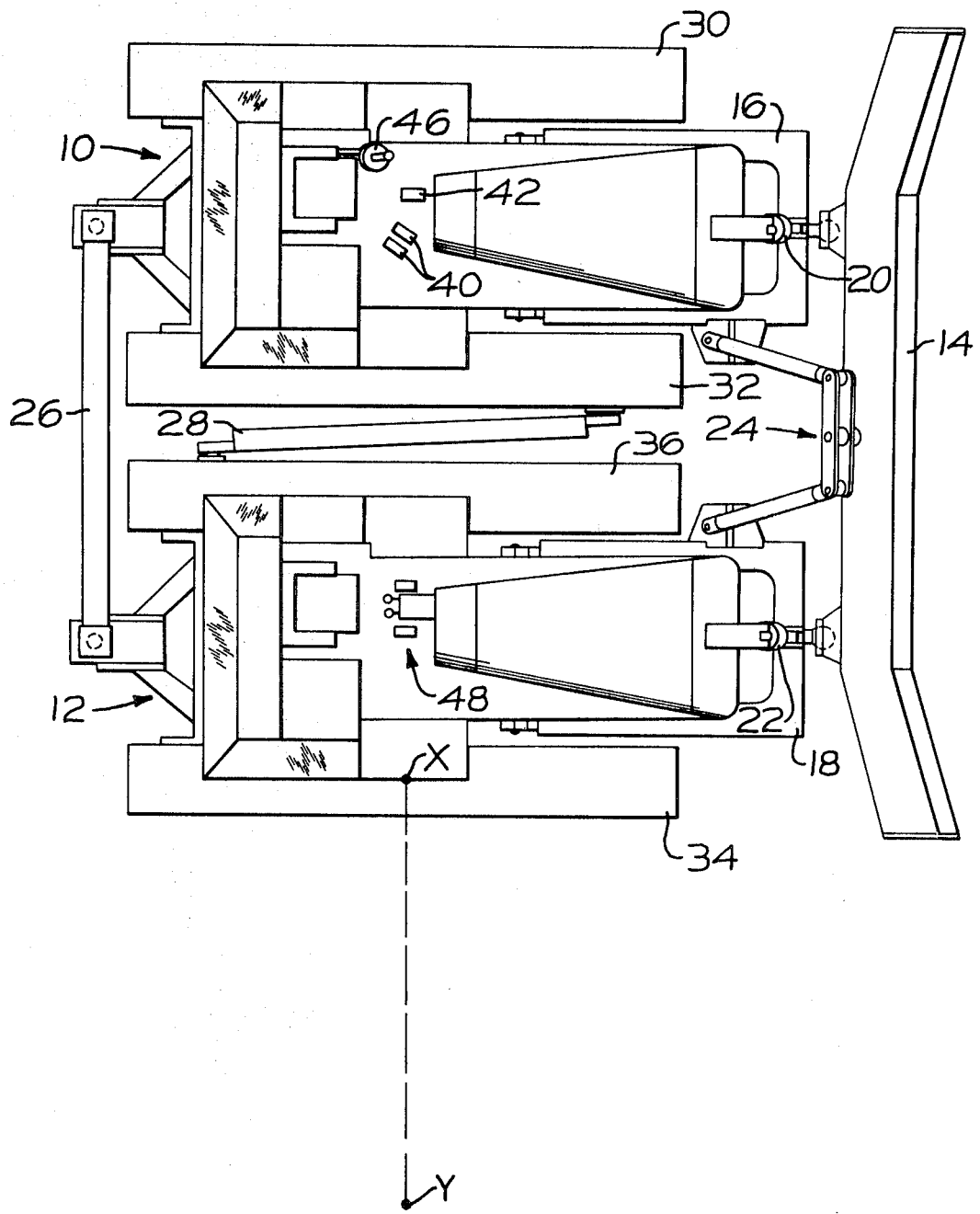

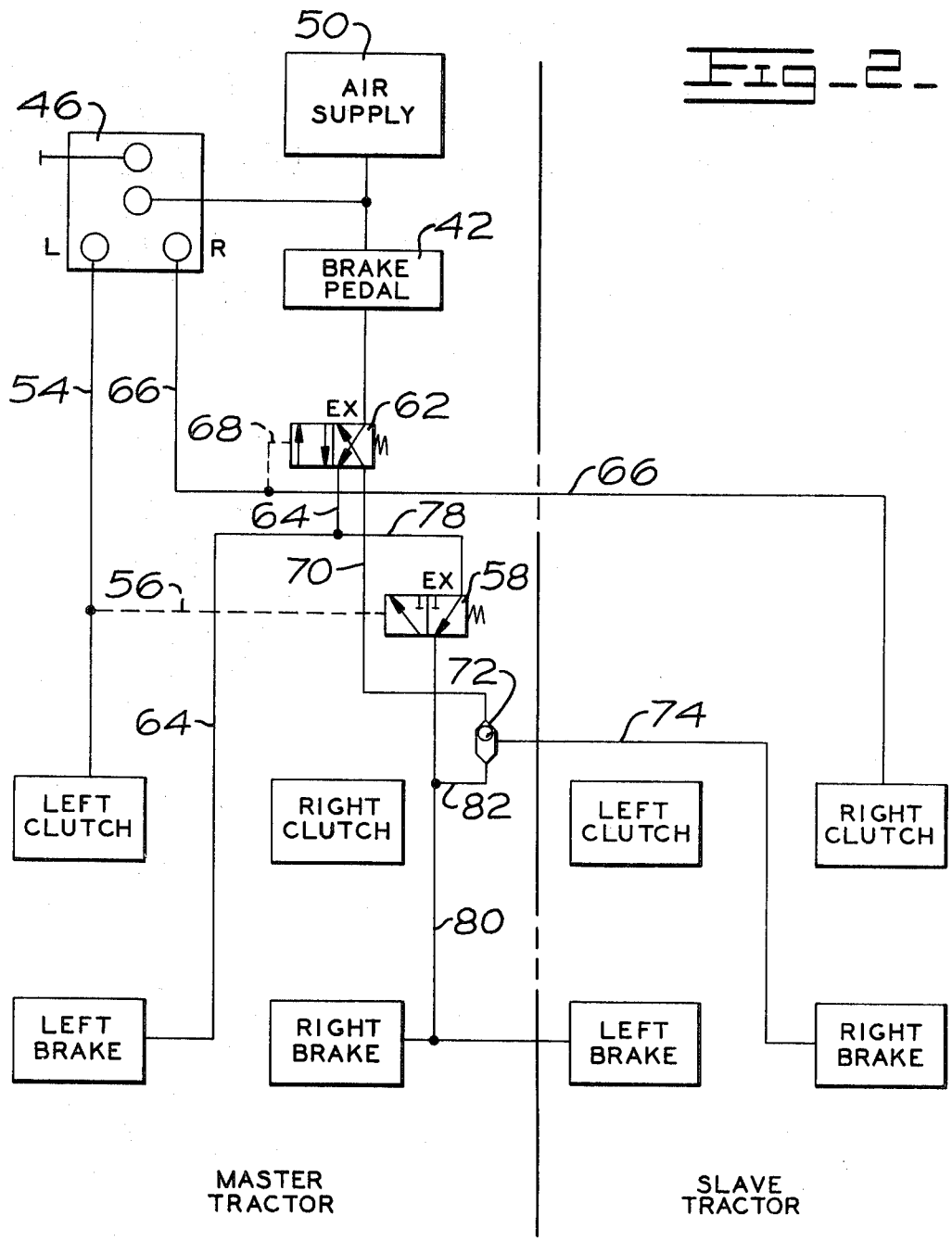

METHOD AND APPARATUS FOR STEERING FOUR-TRACK TRACTORS

The use of two large tractors in tandem, or in side-by-side coupled relationship and under control of a single operator, is becoming quite widely accepted for some operations, such for example as dozing, pushing and ripping. An example of a combined pair of tractors operating side by side is to be found in our assignees' application for U.S. Pat., Peterson et al., Ser. No. 635,803.

Combining of the controls of two such machines to enable full control by a man at a single operator's station has presented many problems, not the least of which is steering. Steering of tandem-coupled track-type tractors is disclosed in detail in our assignees' U.S. Pat. No. 3,245,488 to Robert A. Peterson and U.S. Pat. No. 3,324,963 to Donald H. Stroot and Donald E. Sunderlin, to which further reference will presently be made.

Steering of track-type tractors has traditionally been said to be done by driving or braking which, to briefly review, includes the use of a clutch and a brake for each track to enable disengaging the drive and/or applying the brake to either track while the other track drives and causes steering in the direction of the disabled track. It is found that this and various other systems of steering are available to side-coupled tractors. For example, increasing the speed of one tractor turns the couple in the direction of the other one. Varying the load, as by lowering one corner of the dozer blade causes steering. Steering is also accomplished by varying the drive ratio through the transmissions of the two tractors. Generally, however, steering by driving or braking has proven most desirable.

The simplest means to accomplish such steering of a side-coupled pair of tractors is to disengage and brake the tracks of one tractor while the other continues to drive and to cause turning. We have found that superior steering is accomplished when only one track, that is the outboard track of each tractor, is disengaged and braked for steering purposes. Since many advantages are obtained by this system we have devised a means to make it possible with a single simple set of operator controls. The controls employ some principles of blocking and directing actuating air to tractor components taught by U.S. Pat. Nos. 3,245,488 and 3,224,963 referred to above but in the present case result in an entirely new method of steering a four-track unit.

This invention is more fully set forth in the following specification wherein it is described in greater detail by reference to the accompanying drawings.

In the drawings:

FIG. 1 is a schematic plan view of two tractors coupled in side-by-side relationship and carrying a bulldozer blade.

FIG. 2 is a schematic diagram of a pneumatic system employed to actuate the clutches and brakes of the tractors for steering purposes and in accordance with the present invention.

Referring first to FIG. 1 a pair of side-coupled tractors is shown as comprising a left-hand or master tractor, generally indicated at 10 and a right-hand or slave tractor generally indicated at 12. The master tractor is the one upon which controls for both are disposed so either may be selected as master at the time that the controls are installed. A blade 14 is disposed forwardly of the tractors and supported by C-frames 16 and 18 on the tractors, lift jacks 20 and 22 and a singletree brace structure generally indicated at 24, all as described in complete detail in the Peterson application Ser. No. 635,803 hereinabove referred to. A suitable cross brace 26 extending between the drawbar structure at the rear ends of the tractor and a diagonal brace 28 between the tractors both contribute to a rugged but slightly flexible connection.

The left-hand tractor 10 is shown as having a left or outboard track indicated at 30 and an inboard track at 32. Similarly, the tractor 12 has a right or outboard track 34 and a left or inboard track 36.

As previously stated it is possible to steer this side-coupled unit in several ways, including driving only one of the tractors so that steering is accomplished by pivoting the other tractor. Tests have proven, however, that driving with the three tracks 30, 32 and 36 while the single outboard track 34 is disabled, by being disengaged through its clutch and by applying its brake, is considerably more desirable and efficient. According to the present invention this type of steering is made possible by controls which enable disengaging of the clutch of either outboard track 30 or 34. A single pedal-actuated brake valve is employed for applying brakes simultaneously to all four tracks. Furthermore, when the clutch of either track 30 or 34 is disengaged the brake circuits are also adjusted so that engagement of the brake-actuating pedal effects application of the brakes of that track exclusively. Consequently, either of the outboard tracks can be disengaged and braked while the other three tracks continue to drive with full power.

Typical controls are illustrated with the operator's station disposed on the left-hand tractor 10 where two accelerator pedals are shown at 40 and one brake pedal at 42 while a steering valve which will be more fully explained in connection with FIG. 2 is represented at 46. Conventional controls generally indicated at 48 on the right-hand tractor 12 remain in place so that upon separating the two tractors from their coupled state they may, through simple adjustment, be placed in use as single tractors.

The steering controls are clearly shown in schematic form in FIG. 2 with the steering valve again indicated at 46. This valve, which is of a conventional make, directs air from a pressure source 50 either to a left or right steering outlet of the valve. Assuming that the valve is shifted to the left position, air will flow through a line 54 to the rotochamber which serves to disengage the clutch of the left track 30 of FIG. 1 identified as left clutch. Pressure in line 54 is directed through a pilot line represented by 56 to move the spool of a spring-biased valve 58 to prevent pressure from flowing toward the right brake of the left tractor and both brakes of the right tractor. Consequently, when the brake pedal shown at 42 is depressed to open the brake valve, air from source 50 will flow through a valve 62 and a line 64 to a left brake rotochamber, the flow being blocked to all of the other brake rotochambers.

For steering toward the right, air from supply 50 will flow through the steering valve in its right position and line 66 to the right clutch rotochamber to disengage the clutch of the right track 34 on the right-hand tractor. The pilot line 68 moves the spool of valve 62 toward the right against the force of its spring and air from supply 50 will upon actuation of the brake pedal flow through line 70 and check valve 72 and line 74 to the right brake rotochamber. This check valve 72 which is double acting in this case prevents flow of air to the right brake of the left tractor and left brake of the right tractor. The left brake of the left tractor is disassociated from the air pressure by being vented to atmosphere through an exhaust port from valve 62.

When the tractor is not being steered braking can be applied to all four tracks simultaneously and since neither of the valves 58 or 62 has been affected by pressure from the steering system air from the supply 50 will, upon opening of the brake valve by pedal 42, flow through line 64 to the left brake rotochamber of the left tractor. At the same time it will flow through a branch line 78 and valve 58 where a line 80 has branches serving the right brake of the left tractor and the left brake of the right tractor. Another branch line 82 communicates pressure from line 80 and moves check valve 72 to the position shown to admit pressure through line 74 to the right brake of the left tractor. In FIG. 2 a right clutch on the left tractor and a left clutch on the right tractor are shown as having no association with the control circuit. These clutches are on the two inboard tracks and are always engaged since power to the tracks is controlled by the torque converters of the tractors. These two clutches could in fact be removed except that they are required upon separation of the two units for use individually as two-track tractors.

This steering by interrupting the drive or braking a single one of the four tracks is superior because it interferes with power only to one of the tracks while full power is available to the other three tracks. Furthermore, if both tracks of one tractor are disabled, not only is power reduced but both tracks are spun in rough skidding engagement with the earth which is in itself undesirable. The point about which a turn is made, that is the center of the radius of turn is normally disposed outboard of the center of the disabled tractor. With the single track disabled such as track 34 the center of turning radius can be at about the center of the track 34 as indicated at X or, depending upon whether the track 34 is completely disabled and the relative speed of the other tracks, the center of the turning radius may be spaced considerably outboard of the disabled track as represented for example at Y. The center may occur in fact at any point along the broken line connecting X and Y but in any case a minimum of scraping or skidding of the disabled track is accomplished.

A still further advantage is obtained with the above-described controls when steering is accomplished by varying the load, as by lowering one end of the dozer blade deeper into the earth. In this type of steering the speed of the disabled track is retarded without braking. Consequently, the driving force consumed in the heat of friction of the brake is retained and the machine moves forwardly on a curved path with substantially no loss of effective power.

We claim:

1. A method of steering a track-type tractor having an even number more than two of driven track means arranged in side-by-side relationship comprising the steps of retarding the speed of only the outboard track means on the side toward which steering is desired and applying equal forward drive and speed to all of the other track means.

2. The method of claim 1 in which retarding is accomplished by disengaging the driving force from said outboard track means.

3. The method of claim 2 in which retarding is augmented by the application of braking force to said outboard track means.

4. The method of claim 2 in which retarding is augmented by increasing resistance to forward motion of the tractor on said outboard side toward which turning is required without applying braking force and while retaining driving force in all track means.

5. The method of claim 1 in which the tractor has at least four track means whereby forward-driving force may always be applied to at least three track means.

6. Apparatus for steering a tractor with four track means in side-by-side relationship comprising a power drive for each track means including a clutch, a brake for each track means, control means common to all said brakes, control means to release the clutch selectively on either of two outboard track means, and means effective in response to such release to disable the brake-control means to prevent braking of said four track means except for the track means having the released clutch.

7. The apparatus of claim 6 in which the tractor comprises two side-coupled two-track tractors and in which all said control means are at an operator's station of one of said two-track tractors.